United States Patent
Smith et al.

(10) Patent No.: US 8,051,969 B2
(45) Date of Patent: Nov. 8, 2011

(54) ALL-WHEEL DRIVE (AWD) COUPLING WITH A VARIABLE TRAVEL RATIO AND WEAR COMPENSATION

(75) Inventors: David Smith, Wadsworth, OH (US); Jeffrey Hemphill, Copley, OH (US); James Habegger, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 663 days.

(21) Appl. No.: 11/805,595

(22) Filed: May 24, 2007

(65) Prior Publication Data
US 2007/0272507 A1 Nov. 29, 2007

Related U.S. Application Data

(60) Provisional application No. 60/808,390, filed on May 25, 2006.

(51) Int. Cl.
*F16D 19/00* (2006.01)
(52) U.S. Cl. ............. 192/93 A; 192/70.252; 192/111.18
(58) Field of Classification Search ............... 192/70.23, 192/53.331, 93 A, 93 R, 99 S; 74/665 G
See application file for complete search history.

(56) References Cited

U.S. PATENT DOCUMENTS

| | | | | |
|---|---|---|---|---|
| 710,759 | A * | 10/1902 | Coleman et al. | 188/82.9 |
| 2,163,028 | A * | 6/1939 | Foster | 192/93 R |
| 2,428,128 | A * | 9/1947 | Sheppard | 416/26 |
| 4,878,567 | A * | 11/1989 | Buckley et al. | 192/18 R |
| 5,884,526 | A * | 3/1999 | Fogelberg | 74/335 |
| 6,698,565 | B2 * | 3/2004 | Cool et al. | 192/94 |
| 2002/0032096 | A1 | 3/2002 | Gassmann | |

FOREIGN PATENT DOCUMENTS

JP 02077329 A * 3/1990

* cited by examiner

*Primary Examiner* — David D Le
*Assistant Examiner* — Ryan Dodd
(74) *Attorney, Agent, or Firm* — Simpson & Simpson, PLLC

(57) ABSTRACT

In a torque coupling having an input flange, an input shaft, an actuator, and a multiple clutch pack, and a driving mechanism, the present invention broadly comprises an actuator for transferring the input toque to the output shaft. The actuator comprises an actuator plate which is limited to only rotational movement, a pressure plate which is limited to only axial movement, and a plurality of actuator pins. The driving mechanism rotates the actuator plate through a gear set and forces the actuator pins to move vertically. The vertical movement of the actuator pins forces the pressure plate in an axial direction. In a torque coupling, the actuator is used to transfer the input torque to the output shaft through compression of the multiple clutch pack by the actuator.

14 Claims, 6 Drawing Sheets

ALL-WHEEL DRIVE (AWD) COUPLING WITH A VARIABLE TRAVEL RATIO AND WEAR COMPENSATION

CROSS-REFERENCE TO RELATED APPLICATIONS

This application claims the benefit under 35 U.S.C. §119 (e) of U.S. Provisional Application No. 60/808,390 filed May 25, 2006.

FIELD OF THE INVENTION

The present invention relates generally to improvements in drive line couplings and, more specifically, to a variable actuator using pins connected to plates by ball and socket connections allowing the transfer of torque.

BACKGROUND OF THE INVENTION

The drive line coupling is well known throughout the automotive industry. In an active all-wheel drive system, the coupling is used to transfer torque from the engine to the wheels that are not normally driven except in certain circumstances, such as wheel slip in the primary drive wheels due to icy or rainy conditions. The traditional coupling for an all-wheel drive application uses a driveshaft to transfer torque from the transfer case to both the front and rear axle as needed, whereby either the front or rear axle is continuously engaged and the other axle is engaged by the operator or the vehicle's computer, as necessary.

A transfer case is generally attached to the transmission output shaft where it receives torque from the transmission. In an all-wheel drive system, torque is transferred to the appropriate axles by the transfer case. The primary drive wheels, those which are constantly driven, are driven by a differential placed between the transfer case and the primary drive wheels. The secondary drive wheels, those which are not constantly driven, are driven by a differential placed between the transfer case and the secondary drive wheels.

In an active all-wheel drive system, torque from the transmission is constantly being directed to both the primary and secondary drive axles via the transfer case. The active all-wheel drive system optimizes the traction of the vehicle by directing torque to the secondary drive wheels when a slip is detected in the primary drive wheels. The active all-wheel drive system uses a coupling at the secondary differential or integrated into the transfer case to control power distribution. The flow of torque to the secondary drive wheels can be controlled at either the transfer case or at the coupling of the secondary differential. If the torque is controlled at the secondary drive axle coupling, the transfer case is constantly directing torque to the primary and secondary drive wheels. If the torque is controlled by the transfer case, a secondary coupling is not necessary, as a direct system can be used at the differential due to the transfer case's additional control of the torque flow.

The current state of the art in an active all-wheel drive system uses a transfer case which constantly transfers torque to the secondary drive wheels through a coupling device. The coupling device contains an input flange which is coupled to an input shaft, which transfers torque to the output shaft upon the exertion of force on the clutch pack by a ball and ramp mechanism. The coupling system does not transfer the input torque to the wheels in the traditional non-slip mode. The ball and ramp mechanism is activated by the rotation of an electric motor which causes the ramps to expand. The expansion of the ramps compresses the clutch pack and connects the input shaft and the output shaft thereby transferring the torque from the input shaft to the output shaft and ultimately to the secondary drive wheels. The use of a ball and ramp mechanism creates a linear ratio and therefore is not fully optimized with respect to the speed in which torque is transferred or the size of the electric motor.

Thus, there is a need for an improved actuating drive line coupler.

BRIEF SUMMARY OF THE INVENTION

The present invention broadly comprises an actuator for use in a torque coupling device, comprising an actuator plate, a pressure plate, and, a plurality of actuator pins pivotally secured to the actuator plate and the pressure plate and arranged to axially displace the pressure plate relative to the actuator plate in response to rotation of the actuator plate. The invention also includes a coupling for transferring torque, the coupling comprising an actuator, the actuator comprising an actuator plate, a pressure plate, and, a plurality of actuator pins pivotally secured to the actuator plate and the pressure plate and arranged to axially displace the pressure plate relative to the actuator plate in response to rotation of the actuator plate, an input shaft, an output shaft, a multiple disc clutch pack, and, a driving mechanism.

It is a general object of the present invention to provide an actuator for use in a torque coupling device which provides faster coupling activation.

It is a further object of the present invention to provide a coupling for transferring torque which reduces the required output of the activation device.

These and other objects, features and advantages of the present invention will become readily apparent and appreciated by those having skill in the art in view of the following detailed description of the invention, in view of the several drawings and appended claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred embodiment, it is to be understood that the invention as claimed is not limited to the preferred embodiment.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
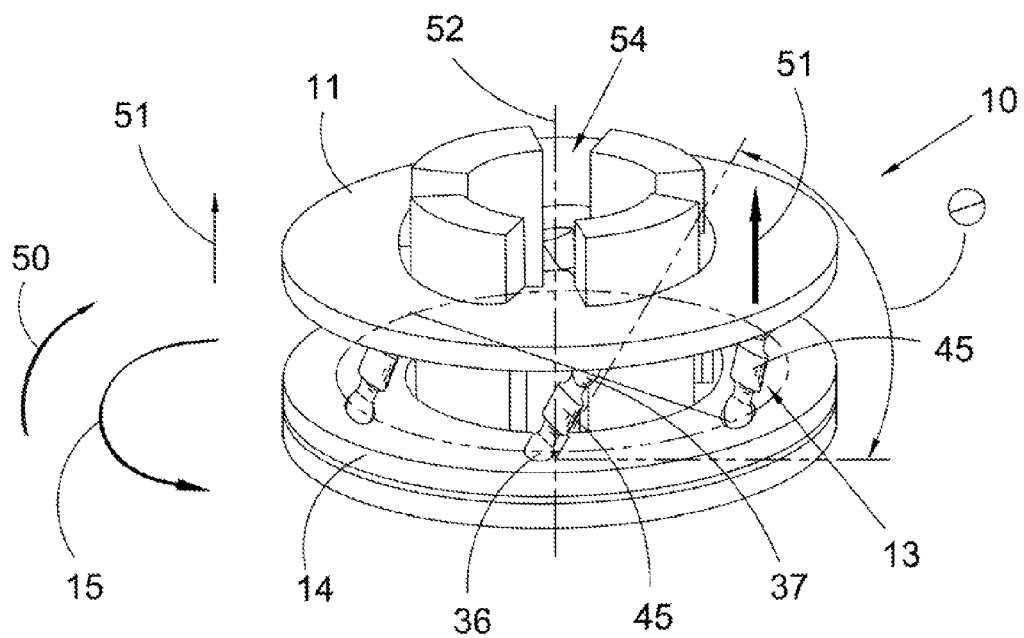
FIG. 1 is a perspective view of the rocker actuator of the present invention.

FIG. 1 is a perspective view of rocker actuator 10 of the present invention.

Figure 2:
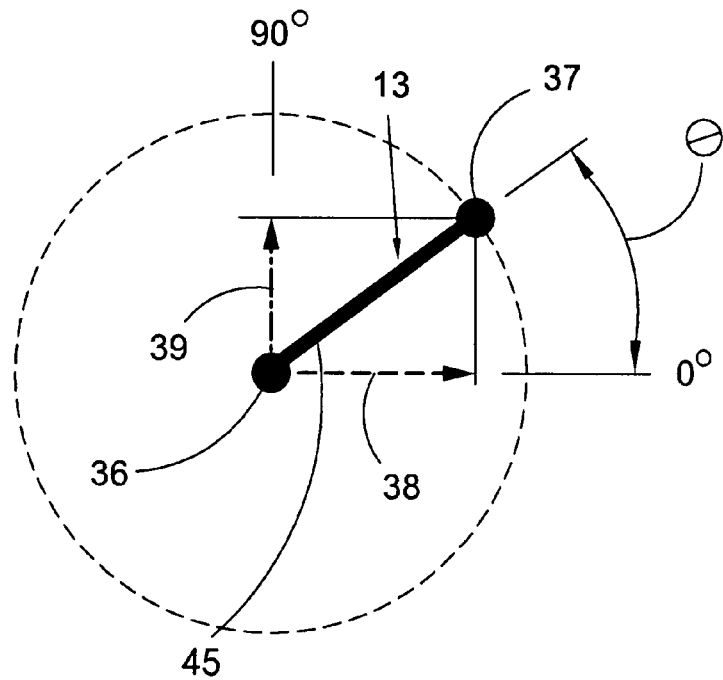
FIG. 2 is a diagram showing the relationship of horizontal versus vertical travel for a pin shown in FIG. 1, with respect to variation of angle θ shown in FIG. 1.

FIG. 2 is a diagram showing the relationship of horizontal versus vertical travel for a pin shown in FIG. 1, with respect to variation of angle θ shown in FIG. 1. Actuator 10 includes actuator plate 14 and pressure plate 11. In operation, actuator plate 14 is limited to only rotational motion and pressure plate 11 is limited to only axial motion. Actuator 10 also includes a plurality of actuator pins 13, located between actuator plate 14 and pressure plate 11, and operatively arranged to connect the actuator plate to the pressure plate via respective ball and socket arrangements. Each actuator pin 13 includes actuator plate ball 36 and pressure plate ball 37, connected by stem 45. Angle θ is created between actuator plate 14 and pins 13, as further described infra.

As actuator plate 14 is rotated, pins 13 are displaced and angle θ is varied. Ball 36 of actuator pin 13 follows rotational motion of actuator plate 14 to vary the angle. For example, for rotation of plate 14 in direction 15, balls 37 of pins 13 move "upward," and angle θ increases. For rotation of plate 14 in direction 50, opposite direction 15, angle θ decreases. Since pressure plate 11 is limited to only axial motion, the rotation of a ball 37 in its socket forces pressure plate 11 to travel axially, that is, parallel to axis 52. The pressure plate 11 maximum travel in direction 51 is reached for an actuator pin angle θ of ninety degrees.

In FIG. 2, the motion of pin 13 as angle θ is varied is divided into horizontal travel 38 and vertical travel 39. Starting with angle θ equal to approximately zero degrees, as angle θ increases (plate 14 is rotated in direction 15), vertical travel 39 is greater than horizontal travel 38. That is, a ball 37 moves more is direction 51 than in a direction parallel to plate 14, for example, parallel to the rotation of plate 14. As angle θ reaches an equilibrium angle between 0 and 90 degrees, travels 38 and 39 become equal. As angle θ continues to increase to 90 degrees, travel 38 becomes greater than travel 39. Starting with angle θ equal to approximately 90 degrees, as angle θ decreases (plate 14 is rotated in direction 50), vertical travel 39 is less than horizontal travel 38. As angle θ reaches the equilibrium angle, travels 38 and 39 become equal. As angle θ continues to decrease, travel 38 becomes less than travel 39. Vertical travel 39 of actuator pin 13 is directly related to the axial travel of pressure plate 11 as shown in FIG. 1.

Figure 3:
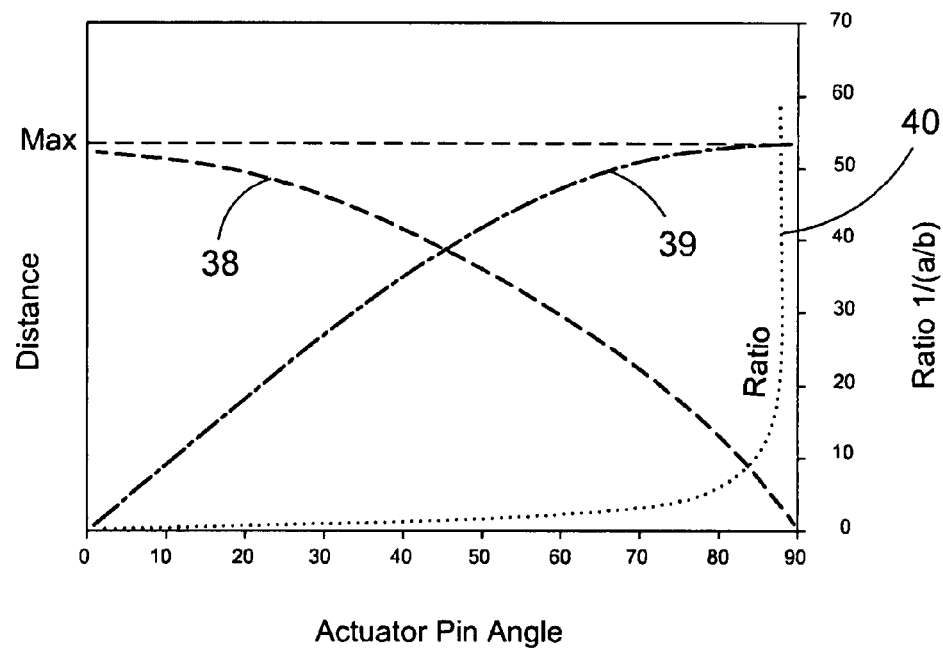
FIG. 3 is a graphical representation of the ratio of actuator pin angle obtained by various pin arrangements for each of the various actuator pins of the rocker actuator of the invention.

FIG. 3 is a graphical representation of the ratio which is obtained by various actuator pin arrangements. FIG. 3 shows variable ratio 40 created by the plot of horizontal travel 38 versus vertical travel 39. As vertical travel 39 increases towards the maximum, variable ratio 40 increases exponentially since horizontal travel 38 decreases towards zero.

Figure 4:
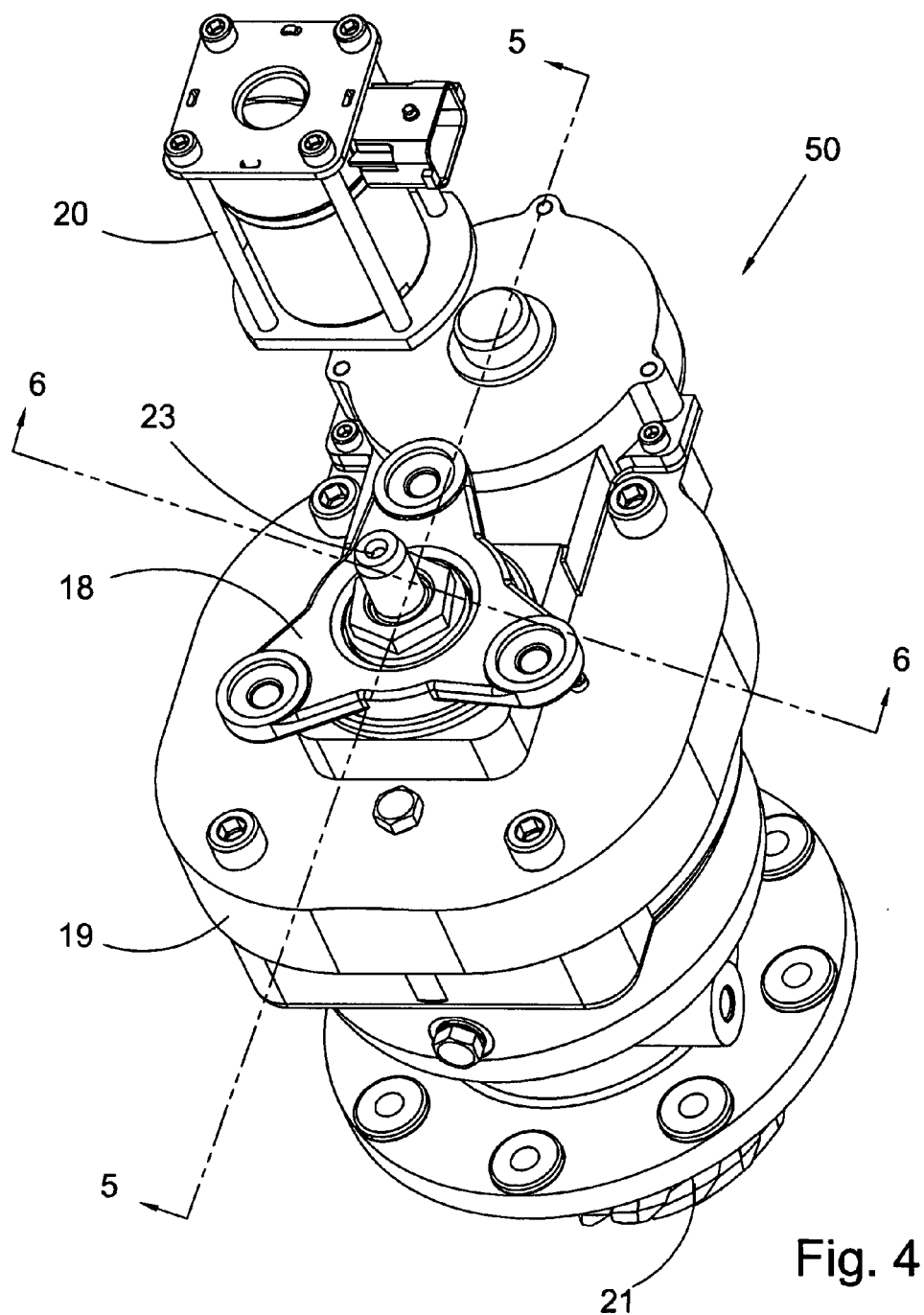
FIG. 4 is a perspective view of the drive line coupling assembly of the invention, which coupling includes the rocker actuator shown in FIG. 1.

FIG. 4 is a perspective view of coupling 50 which incorporates actuator 10 (not shown). The coupling is generally located in a transfer case and functions to transfer torque from the transmission to the drive wheels. The transmission transfers torque to input flange 18, where the torque is then transferred to input shaft 23. The input shaft is housed in input housing 19. When electric motor 20 is activated, actuator 10 is rotated and couples input shaft 23 and output shaft 21 thereby transferring the torque to the drive wheels.

Figure 5:
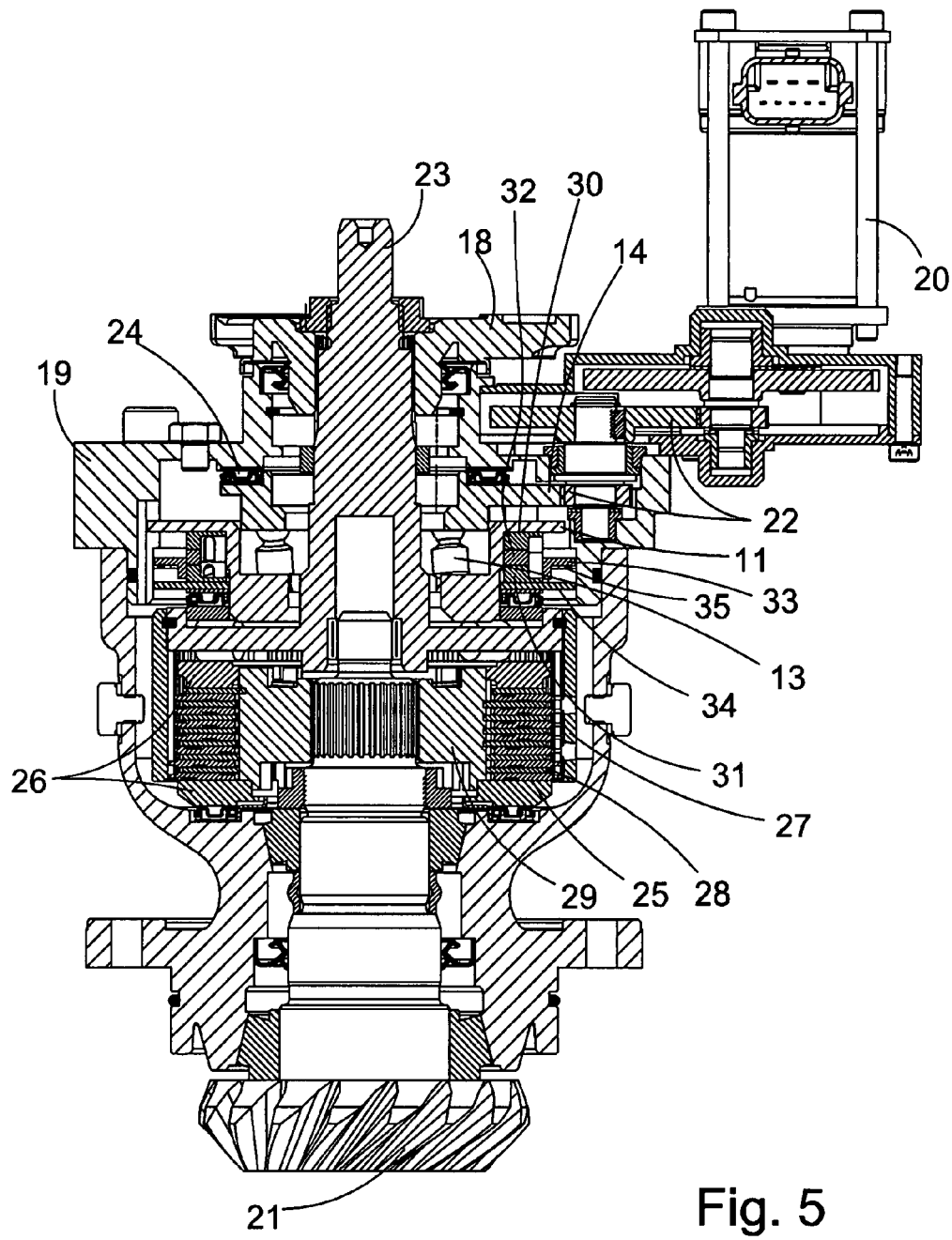
FIG. 5 is a partial cross-sectional view of the coupling assembly shown in FIG. 4, taken generally along line 5-5 in FIG. 4.

FIG. 5 is a partial cross-sectional view of coupling 50 shown in FIG. 4, taken generally along the 5-5 line in FIG. 4. Pressure plate 11 is limited rotationally by engagement of slots 54 with input housing 19. Actuator pins 13 connect pressure plate 11 and actuator plate 14 by way of ball and socket connections as noted supra. The actuator plate is limited to just rotational motion by the input housing and thrust bearing 24.

As shown in FIG. 1, when rotational motion 15 is imparted on actuator plate 14, the bottom of actuator pins 13 attempt to rotate in the same direction, but the ball and socket mechanism forces the actuator pins 13 in a tangential direction to the rotation. Axial movement of actuator pins 13 thereby creates axial movement of pressure plate 11. Angle θ between the actuator plate and the actuator pins is optimized to be equal to the cushion curve, which is the force required to transfer a given torque. The ability to incrementally adjust actuator pin angle θ for each application creates a variable ratio activation unit and as angle θ approaches 90 degrees, axial lift ratio 40 to rotational displacement, for example in direction 15, increases exponentially as seen in FIG. 3.

In FIG. 4, torque is transferred to input flange 18, which is housed in input flange housing 19, by a driveshaft. The torque transferred to the input flange creates rotation of input shaft 23. When torque is needed at the secondary drive wheels for additional traction, a signal is sent to electric motor 20 thereby engaging actuator 10 and transferring torque from input shaft 23 to output shaft 21 by compression of multiple disc clutch pack 26.

Figure 6:
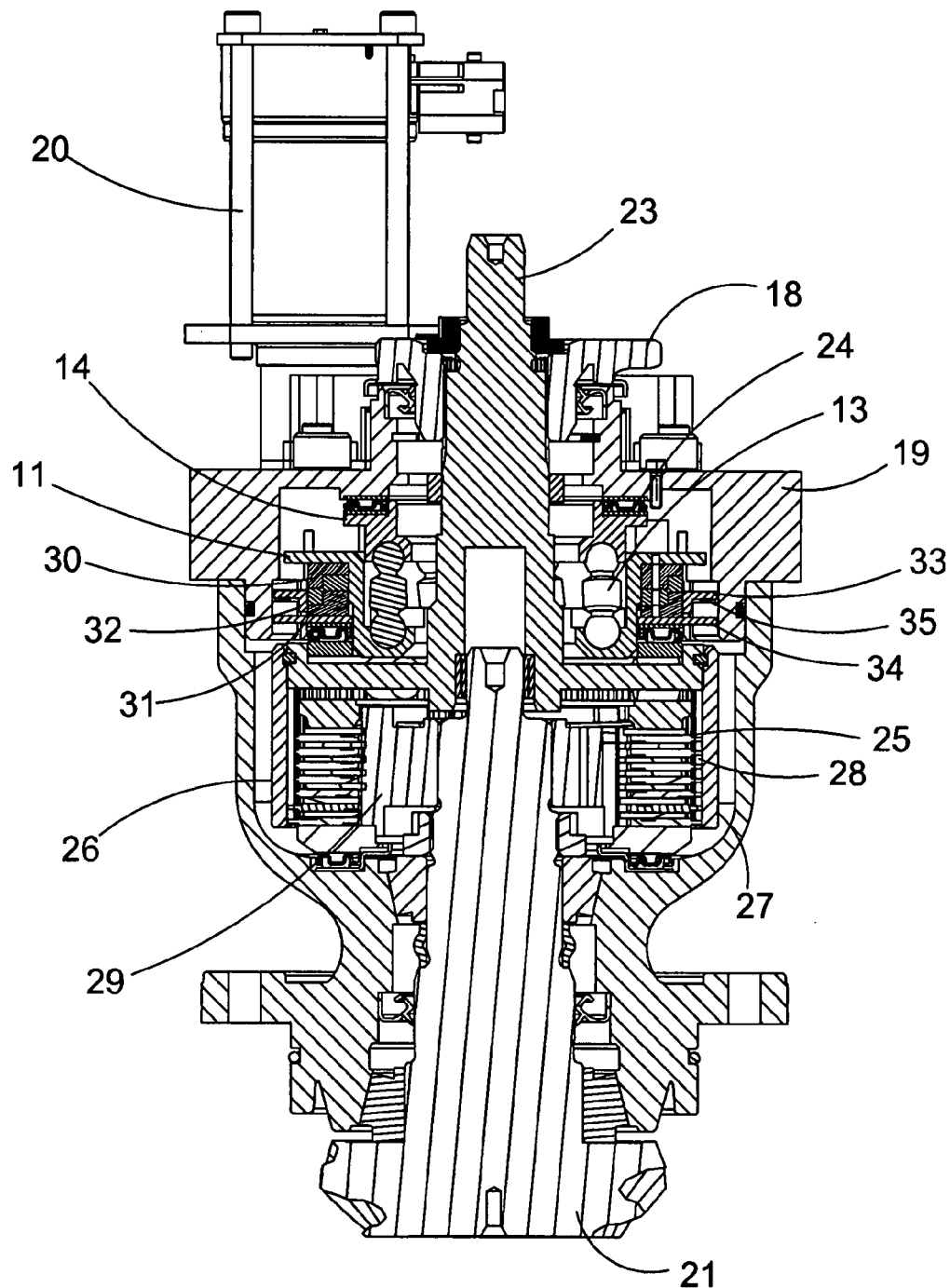
FIG. 6 is a partial cross-sectional view of the coupling assembly shown in FIG. 4, taken generally along line 6-6 in FIG. 4; and, FIG. 7 is an exploded perspective view of the coupling assembly shown in FIG. 4.

FIG. 6 is a partial cross-sectional view of coupling 50 shown in FIG. 4 taken generally along the 6-6 line in FIG. 4.

Figure 7:
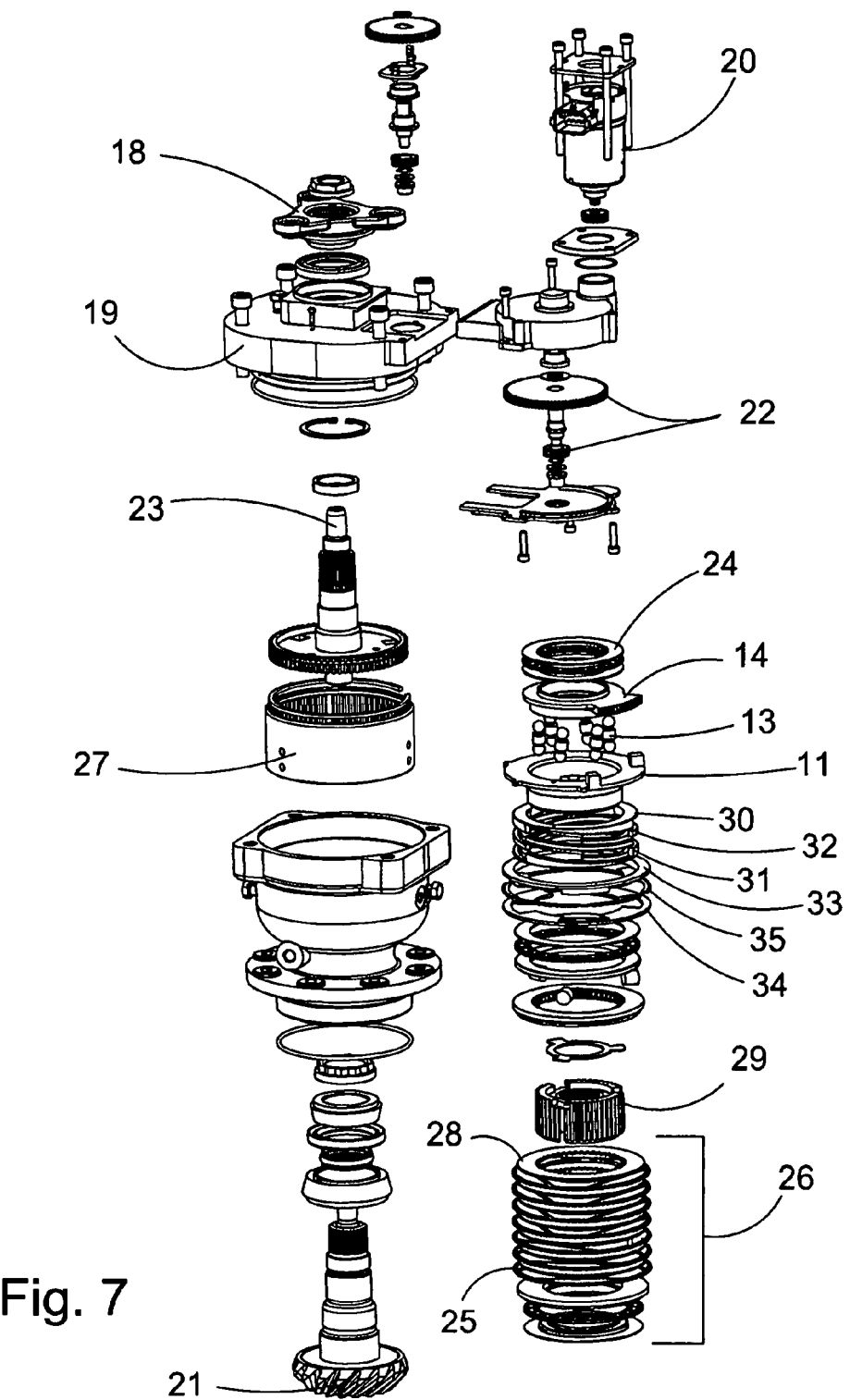

FIG. 7 is an exploded perspective view of the coupling assembly shown in FIG. 4. In FIG. 5, electric motor 20 rotates gear set 22 which in turn rotates actuator plate 14. When the actuator plate is rotated in direction 15, the actuator pin angle begins to increase due to the reaction force rotationally fixed pressure plate 11 imparts on actuator pin 13. Pressure plate 11 is rotationally fixed by engagement of slots 54 in input housing 19. Actuator plate 14 movement is limited to just rotational by input housing 19 and thrust bearing 24. When actuator 10 is expanded due to rotation of electric motor 20, torque imparted on input flange 18 is transferred to input shaft 23 and is then transferred to output shaft 21. When the actuator is in its contracted state (the axial distance between plates 11 and 14 is at a minimum), toque imparted on input flange 18 is transferred to the input shaft, but there is no connection made with the output shaft and therefore the input shaft spins freely.

Discs 25 in multiple disc clutch pack 26 are engaged with input shaft 23 by way of input shaft sleeve 27. The discs are rotationally fixed by engagement of slots in the input shaft sleeve. Pressure plates 28 in the multiple disc clutch pack are engaged with output shaft sleeve 29 by engagement of slots. Torque is transferred from the input shaft to the input shaft sleeve. Compression of multiple disc clutch pack 26 by actuator 10 transfers torque from the input shaft sleeve to the output shaft sleeve. The output shaft sleeve is connected with output shaft 21 by engagement of slots. The torque is finally transferred from the output shaft sleeve to the output shaft.

A wear compensator is also seen in FIGS. 5 through 7. The wear compensator is comprised of two components, a ramp set for incremental adjustment and an annular ring assembly. In some aspects, the annular ring assembly is as described in the commonly assigned, and therefore uncitable, U.S. Provisional Patent Application No. 60/809,433, filed May 30, 2006 and entitled "ANNULAR RING AND ANNULAR RING ASSEMBLY FOR CONTROLLABLE POSITIONING ON A PILOT TUBE," inventors Dave Smith and Brian Zaugg, can be used.

The ramp set comprises of two outer adjustment ramps 30 and 31, and inner adjustment ramp 32. When pressure plate 11 is moved axially by rotation 15 of actuator plate 14, outer adjustment ramp 30 is forced axially in the same direction as pressure plate 11. The force on outer adjustment ramp 30 is transferred to inner adjustment ramp 32 which is forced in an axial and rotational motion due to the outer adjustment ramps movement in the same direction as pressure plate 11. The axial and rotational force on inner adjustment ramp 32 is transferred to axial only force on other outer adjustment ramp 31. Outer adjustment ramps 30 and 31 and inner adjustment ramp 32 compensate for wear in multiple disc clutch pack 26. As the multiple disc clutch pack wears, the axial and rotational movement of inner adjustment ramp 32 compensates for the wear. The wear compensator of multiple disc clutch pack 26 compensates for the gaps caused by wear in the multiple disc clutch pack while still maintaining a constant pressure plate 11 travel.

The wear compensator also includes an annular ring assembly. The annular ring assembly is comprised of two drag sheets 33 and 34, and drag ring 35. The annular ring assembly allows free travel in one axial direction and limits travel in the opposite axial direction. Top drag sheet 33 is connected to bottom outer adjustment ramp 31. The axial force on the bottom outer adjustment ramp is transferred to top drag sheet 33. The top drag sheet moves axially in the same direction as pressure plate 11. Top drag sheet 33 moves drag ring 35 in the same direction as the pressure plate. Drag ring 35 moves bottom drag sheet 34 until multiple disc clutch pack 26 is fully compressed. When the multiple disc clutch pack is no longer transferring torque, bottom drag sheet 34 moves the drag ring in the opposite direction. The drag ring forces top drag sheet 33 in the opposite direction of the compression stroke until the top drag sheet is in its original position. Once the top drag sheet is in its original position, the angle of drag ring 35 prevents axial movement in the same direction due to the opposite angle being on top drag sheet 33.

Thus it is seen that the objects of the invention are efficiently obtained, although modifications to the invention should be readily apparent to those having ordinary skill in the art, and these changes and modifications are intended to be within the scope of the claims.

We claim:

1. An actuator for use in an automotive torque coupling device, comprising:
    an actuator plate;
    a pressure plate fixed with respect to rotation;
    a plurality of actuator pins with respective first and second ends pivotally secured to said actuator plate and said pressure plate, respectively;
    a first disc-shaped ramp with a first surface orthogonal to the axis of rotation for the actuator;
    a second disc-shaped ramp with a second surface orthogonal to the axis of rotation and facing the first surface in a direction orthogonal to the axis of rotation; and
    a third disc-shaped ramp disposed between the first and second ramps in a direction parallel to the axis of rotation, wherein:
        an axial thickness of the first disc-shaped ramp varies along a circumference at a first radius;
        an axial thickness of the second disc-shaped ramp varies along a circumference at a second radius;
        the actuator plate is rotatable to apply a circumferential force to the respective first ends of the plurality of pins;
        the respective second ends of the plurality of pins displace axially away from the actuator plate in response to the circumferential force;
        the pressure plate displaces axially, while remaining rotationally fixed, in response to the axial displacement of the respective second ends of the plurality of pins; and,
        the first and second ramps are axially displaceable in response to the axial displacement of the pressure plate.

2. The actuator recited in claim 1 wherein said plurality of actuator pins are secured to said actuator plate and said pressure plate, respectively, in a ball and socket arrangement.

3. The actuator of claim 1, wherein said plurality of pins is arranged to axially displace said pressure plate closer to said actuator plate in response to rotation of said actuator plate in a first direction.

4. The actuator of claim 3, wherein said plurality of pins is arranged to axially displace said pressure plate further from said actuator plate in response to rotation of said actuator plate in a second direction, wherein said second direction is different than said first direction.

5. The actuator recited in claim 1, wherein said plurality of pins form an angle $\theta$ with respect to said actuator plate and said plurality of pins are arranged to increase said angle $\theta$ in response to rotation of said actuator plate in said second direction.

6. The actuator recited in claim 1, wherein said plurality of pins form an angle $\theta$ with respect to said actuator plate and said plurality of pins are arranged to decrease said angle $\theta$ in response to rotation of said actuator plate in said first direction.

7. A coupling for transferring torque, the coupling comprising:
    an actuator, said actuator comprising an actuator plate, a pressure plate fixed with respect to rotation, and, a plurality of actuator pins pivotally with respective first and second ends secured to said actuator plate and said pressure plate, respectively;
    an input shaft;
    an output shaft;
    a multiple disc clutch pack;
    a driving mechanism
    a first disc-shaped ramp with a first surface;
    a second disc-shaped ramp with a second surface facing the first surface in a direction parallel to an axis of rotation for the actuator; and;
    a third disc-shaped ramp disposed between the first and second ramps in the direction parallel to the axis of rotation, wherein:
        the actuator plate is rotatable to apply a circumferential force to the respective first ends of the plurality of pins;
        the respective second ends of the plurality of pins displace axially away from the actuator plate in response to the circumferential force;

the pressure plate displaces axially, while remaining rotationally fixed, in response to the axial displacement of the respective second ends of the plurality of pins;

the first, second, and third ramps are located between the pressure plate and the multiple disc clutch pack in the direction parallel to the axis of rotation;

the axial displacement of the pressure plate causes axial displacement of the first ramp;

the axial displacement of the first ramp causes axial displacement of the second ramp; and, the axial displacement of the second ramp causes axial displacement of at least a portion of the multiple disc clutch pack.

8. The coupling of claim 7, wherein said input shaft is engaged with discs of said multiple disc clutch pack.

9. The coupling of claim 7, wherein said output shaft is engaged with pressure plates of said multiple disc clutch pack.

10. The coupling of claim 7, wherein said actuator is arranged to transfer torque from said input shaft to said output shaft.

11. The coupling of claim 7 wherein said driving mechanism comprises: a hydraulic unit, an electro-magnetic unit, or an electric unit.

12. The coupling recited in claim 7 wherein the first, second, and third disc-shaped ramps form part of a wear compensator.

13. The coupling recited in claim 12, where in said wear compensator further comprises:
a diaphragm spring;
a connector plate; and,
an axial one-way clutch.

14. The coupling recited in claim 13, where said axial one-way clutch further comprises:
a plurality of drag sheets; and,
at least one drag ring.

* * * * *